United States Patent

[11] 3,572,748

[72] Inventor Frank H. Vivian
   Ottowa, Kans.
[21] Appl. No. 779,990
[22] Filed Nov. 29, 1968
[45] Patented Mar. 30, 1971
[73] Assignee Daybrook-Ottawa Corporation
   Ottawa, Kans.

[54] SUSPENSION SYSTEM FOR VEHICLE WHEELS
   5 Claims, 4 Drawing Figs.
[52] U.S. Cl. ..................... 280/124,
[51] Int. Cl. ..................... B60g 19/00
[50] Field of Search ........................ 280/112, 112.1, 124

[56] References Cited
   UNITED STATES PATENTS

| | | | | |
|---|---|---|---|---|
| 2,782,051 | 2/1957 | Smith | | 267/60X |
| 1,120,036 | 12/1914 | Dearing | | 280/112 |
| 1,155,801 | 10/1915 | Dearing | | 280/112 |
| 3,174,770 | 3/1965 | Drechsel | | 280/112 |
| 996,997 | 7/1911 | Morris | | 280/112 |

*Primary Examiner*—Philip Goodman
*Attorney*—Fishburn, Gold and Litman

ABSTRACT: A suspension system for vehicles having a frame with a transverse frame member for carrying an elongate axle assembly below the transverse frame member, said axle having a pair of laterally spaced vehicle wheels rotatably and steerably mounted on opposite ends thereof. An elongate first housing on said frame member has a guide chamber of rectangular cross section with a bottom opening in which is slidably received an elongate second guide or slide housing with the axle assembly pivotally mounted on a lower end thereof. The structure has engageable portions for limiting vertical and rocking movement of the axle assembly with an elongate spiral spring having an upper end engaging said first housing and a lower end engaging the second slide or guide housing and a pair of elongate inflatable resilient members spaced on opposite sides of the first housing and each having a lower end mounted on the axle assembly and an upper end fixably mounted relative to the axle assembly.

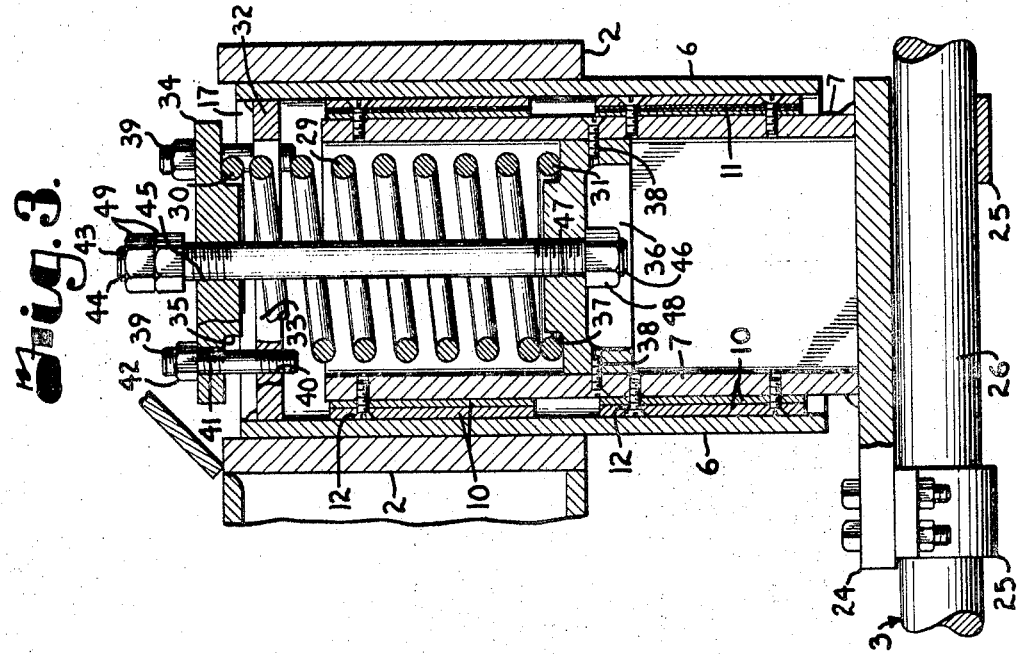
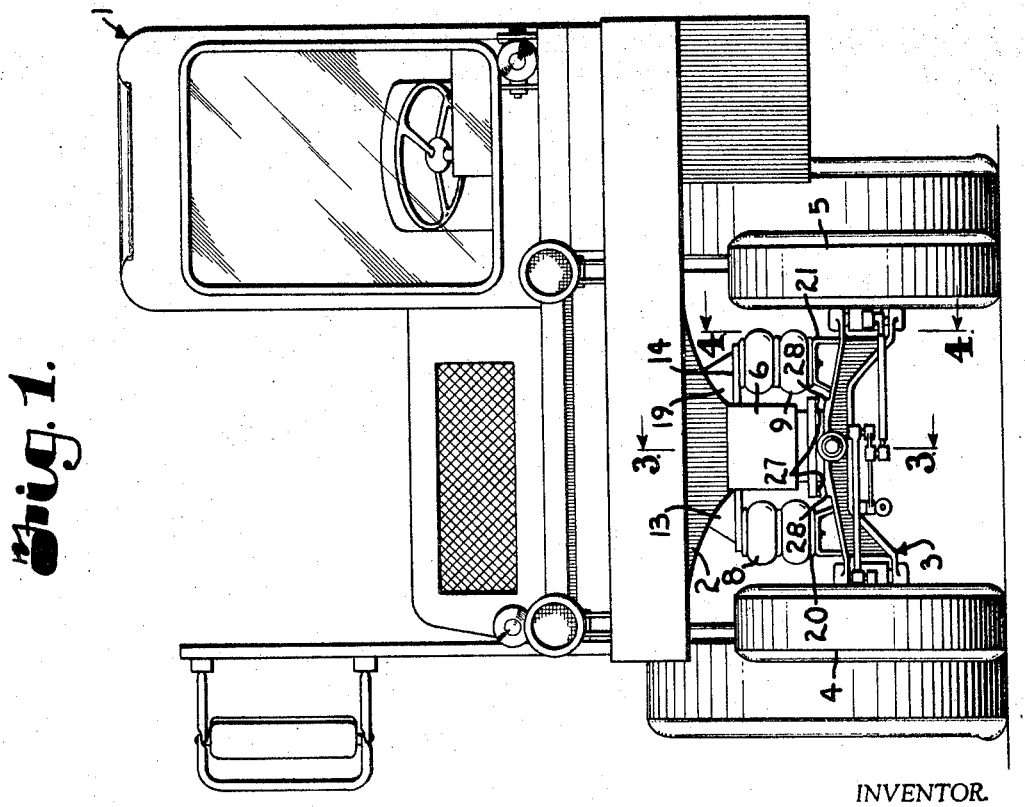

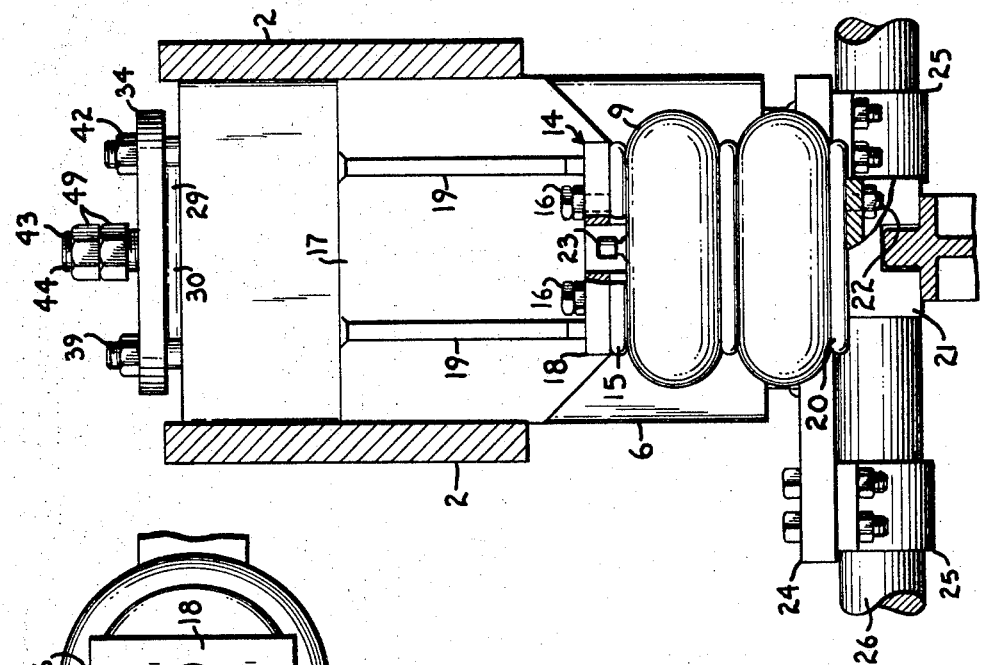
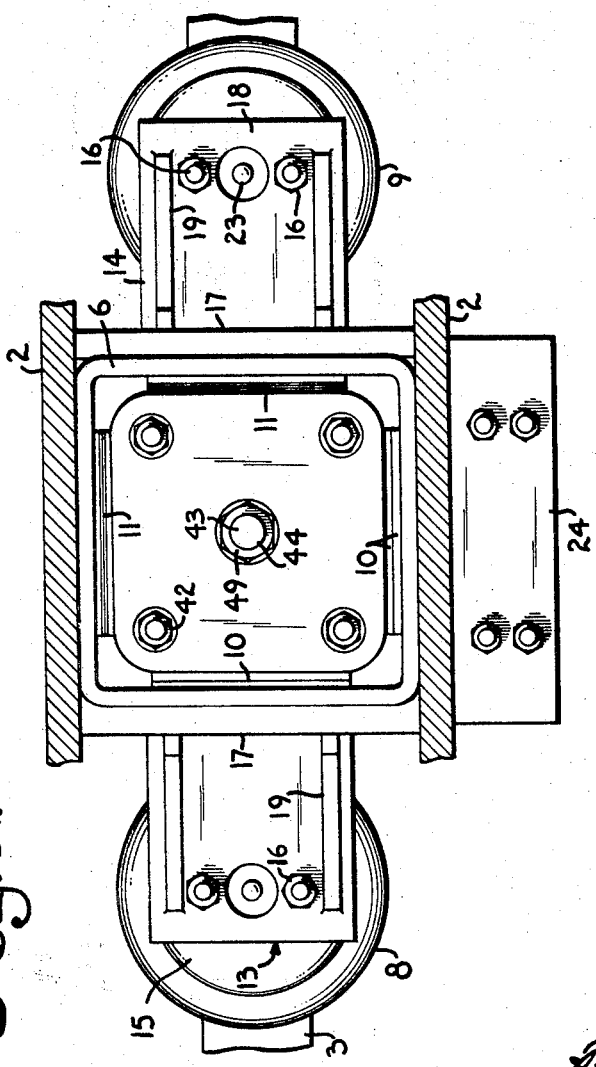

SUSPENSION SYSTEM FOR VEHICLE WHEELS

The present invention relates to suspension systems for vehicle wheels and more particularly to a suspension system permitting limited and cushioned vertical and rocking movement of an axle assembly having vehicle wheels rotatably mounted on opposite ends thereof.

The principal objects of the present invention are: to provide a suspension system for vehicle wheels mounted on opposite ends of an elongate axle assembly wherein the axle assembly is rockable and movable vertically; to provide such a suspension system particularly adapted for travel over surfaces having irregularities therein; to provide such a suspension system wherein shocks of rocking and vertical movement of the axle assembly are substantially reduced by a resilient member and cooperation therewith by an inflatable resilient member mounted adjacent each of the vehicle wheels; to provide such a suspension system wherein vertical rebound shock is substantially limited; to provide such a suspension system wherein the vehicle will remain substantially upright while traveling transversely to a steep gradient; and to provide such a suspension system which is economical to manufacture, efficient and positive in operation, easily maintained and particularly adapted for use with load moving vehicles.

Other objects and advantages of this invention will become apparent from the following description taken in connection with the accompanying drawings wherein are set forth by way of illustration and examples certain embodiments of this invention.

FIG. 1 is an elevational view of a vehicle having a suspension system embodying features of the present invention with the suspension system shown on a front axle of the vehicle.

FIG. 2 is an enlarged fragmentary plan view of the suspension system showing relative alignment of the component parts.

FIG. 3 is an enlarged transverse sectional view through the suspension system taken on line 3—3, FIG. 1.

FIG. 4 is an enlarged transverse sectional view taken on line 4—4, FIG. 1.

Referring more in detail to the drawings:

The reference numeral 1 generally designates a vehicle having a frame with a transverse frame member 2 and an elongate axle assembly 3 below the transverse frame member 2 and having a pair of laterally spaced vehicle wheels 4 and 5 rotatably mounted on opposite ends of the axle assembly 3. An elongate exterior vertical guide structure 6 has an open interior for slidably receiving an elongate interior vertical guide structure 7. The axle assembly 3 is pivotably mounted on a lower end of the interior guide structure 7 whereby the axle assembly 3 is rockable and movable up and down with the interior guide structure 7. A pair of elongate inflatable resilient members 8 and 9 are positioned on opposite sides of the exterior guide structure 6 and adjacent the wheels 4 and 5 respectively and each have a lower end mounted on the axle assembly 3 and an upper end fixably mounted relative to the axle assembly 3 whereby up and down movement and rocking movement of the axle assembly 3 is substantially controlled.

In the illustrated structure, the exterior guide structure 6 is an elongate housing having a noncircular exterior cross section and a noncircular central aperture therein. The interior guide structure 7 is an elongate housing having a noncircular exterior surface corresponding to the central aperture of the exterior housing 6 whereby the axle assembly 3 is maintained in a position substantially parallel with the transverse frame member 2 of the vehicle 1. The interior of the exterior housing 6 and the exterior surface of the interior housing 7 are illustrated as square; however, they may be rectangular. The opposed interior faces of the central aperture of the exterior housing 6 each form ways for slidably guiding respective exterior faces of the interior housing 7 for up and down movement of the axle assembly 3.

In the illustrated structure, a plurality of slide plates 10 are mounted on the exterior faces of the interior housing 7 and are positioned to be in firm slidable engagement with a respective interior face of the central aperture of the exterior housing 6. It is also necessary to allow for wear of the slide plates; therefore, a plurality of spacers or shims 11 may be mounted between the slide plates 10 and the respective exterior faces of the interior housing 7, and in the illustrated structure, a plurality of suitable fastening devices, such as screws 12, secure the slide plates 10 and the spacers or shims 11 in place on the exterior surface of the interior housing 7. It is preferable that the screws 12 have flatheads received in countersunk holes in the slide plates 10 to avoid engagement of the screws 12 with the interior surface of the exterior housing 6. The axle assembly 3 is pivotally mounted on the lower end of the interior guide housing 7, as later described, whereby the axle assembly is rockable. It is, therefore, desirable to limit and cushion the rocking movement.

A pair of brackets 13 and 14 are mounted on opposite sides of the exterior housing 6 and each of the brackets 13 and 14 are above and aligned with the inflatable resilient members 8 or 9 respectively suitably mounted thereon, as by a pair of threaded studs 16 extending upwardly from the upper end member 15.

In the illustrated structure, the brackets 13 and 14 each have a vertical plate member 17 suitably secured to the exterior surface of the exterior housing 6, as by welding, and a support member 18 suitably secured to and extending outwardly from the plate member 17, as by welding. Web members 19 have edges secured to the plate member 17 and to the support member 18 to increase the rigidity of the respective bracket 13 or 14.

A lower end member 20 of the inflatable resilient members 8 and 9 is suitably mounted on a bracket 21 suitably mounted on the axle assembly 3, as by a pair of threaded studs 22 extending downwardly from the lower end member 20. Each of the inflatable resilient members 8 and 9 receive a suitable fluid under pressure, such as air, through a fitting 23 extending upwardly through the support member 18 of the respective brackets 13 or 14. The inflatable resilient members 8 and 9 are thereby positioned adjacent the wheels 4 and 5 respectively for cushioning rocking and vertical movement of the axle assembly.

An axle mounting plate 24 is mounted on a lower end of the interior housing 7 and the axle mounting plate 24 has pin retaining members 25 mounted on a lower surface thereof and positioned to receive a pin 26 extending transversely through the axle assembly 3 whereby the axle assembly 3 is rockable about the pin 26.

The suspension system is particularly adapted for use on vehicles traveling over uneven terrain and deteriorated pavements having numerous holes therein thereby causing rocking movement beyond that which can be absorbed by the inflatable resilient members. Therefore, a pair of abutment members 27 are mounted on the lower surface of the axle mounting plate 24 and the abutment members 27 are equally spaced from and centered on the pin 26. The abutment members 27 are positioned above and aligned with corresponding abutment members 28 on the axle assembly 3 thereby the abutment members 27 are positioned to be engaged by the abutment members 28 on said axle assembly in response to pivotal movement thereof beyond that absorbed by the respective inflatable resilient member 8 or 9.

The inflatable resilient members 8 and 9, the abutment members 27 on the axle mounting plate 24, and the abutment members 28 on the axle assembly 3 are adapted to limit swinging or rocking movement resulting from one of the wheels 4 or 5 dropping or falling into a hole (not shown) or engaging an obstruction, such as a curb. However, when both wheels enter a hole or engage an obstruction substantially simultaneously, an up or down movement of the axle assembly results which is usually beyond that which can be absorbed by the inflatable members. Therefore, suitable resilient means, such as a coil or spiral spring 29 positioned to have opposite ends engage the exterior guide structure 6 and the interior guide structure 7 respectively. In the illustrated structure, the spring 29 is mounted within the interior housing 7 and has an upper end 30 engaging an upper end of the exterior housing 6 and the spring 29 has a lower end 31 engaging the interior housing 7 for limiting the vertical movement of the axle assembly 3.

In the illustrated structure, a closure plate 32 is mounted in the upper end of the exterior housing 6 and has a central aperture 33 therethrough for movement of the coil spring 29 therethrough. An upper retainer 34 is positioned above the closure plate 32 and has a shoulder 35 depending from a lower surface thereof for receiving the upper end 30 of the coil spring 29. A lower retainer 36 is mounted within the interior housing 7 and has a shoulder 37 extending upwardly from an upper surface thereof for receiving the lower end 31 of the coil spring 29. Suitable fastening devices, such as screws 38, fixably mount the lower retainer 36 within the interior housing 7.

The upper retainer 34 is adjustable vertically relative to the closure plate 32 in the upper end of the exterior housing 6 whereby compression in the coil spring 29 may be adjusted thereby adjusting the spring rate thereof. The vertical travel of the axle assembly 3 is thereby adjustable relative to the load on the vehicle 1.

In the illustrated structure, a plurality of threaded shanks or shafts 39 are received in threaded bores 40 in the closure plate 32. The upper retainer 34 has a plurality of plain or unthreaded bores 41 vertically aligned with the threaded bores 40 whereby the threaded shafts 39 may extend through the respective plain or unthreaded bores 41 and suitable tightening devices, such as nuts 42, may be mounted on upper ends of the threaded shafts 39 and engage an upper surface of the upper retainer 34 to thereby vary the compression in the coil spring 29 by adjusting the vertical position of the upper retainer 34.

As the spring 29 is not attached to either the upper or lower retainer 34 or 36, it is, therefore, necessary to prevent the interior housing 7 from being removed from the exterior housing 6 when the axle assembly 3 moves downward as when the wheels 4 and 5 enter a depression in the traveling surface. It is, therefore, desirable to control excessive rebound of the axle assembly 3 relative to the transverse frame member 2.

In the illustrated structure, an elongate shaft 43 has an upper end 44 extending vertically through a plain or unthreaded bore 45 in the upper retainer 34 and a lower end 46 mounted in a threaded bore 47 in the lower retainer 36. The lower end 46 is threaded to interengage with the threaded bore 47 and to receive a nut 48 adjustable on the threaded lower end 46 to engage a lower surface of the lower retainer 46. The upper end of the elongate shaft 43 has suitable rebound limiting means mounted thereon for engaging the upper surface of the upper retainer 34 thereby limiting vertical rebound of the axle assembly 3 when the wheels 4 and 5 move into a depression in the traveling surface. In the illustrated structure, the upper end 44 is threaded and receives nuts 49 adjustably mounted thereon to engage the upper surface of the upper retainer 34 thereby limiting the downward movement of the axle assembly 3 when the wheels 4 and 5 enter a depression.

The spring 29 is sleeved on the shaft 43 and the longitudinal axis of the shaft 43 intersects the longitudinal axis of the pin 26. The inflatable resilient members 8 and 9 are equally spaced from the longitudinal axis of the shaft 43 whereby the vehicle having the suspension system incorporated therein will remain substantially upright while the axle assembly 3 rocks about the longitudinal axis of the pin 26.

It is to be understood that while I have illustrated and described one form of my invention, it is not to be limited to this specific form or arrangement of parts herein described and shown except insofar as such limitations are included in the claims.

I claim:

1. A suspension system for vehicles having a frame with a transverse frame member for carrying a respective wheel carrying axle, said suspension system comprising:

a. a first guide structure connected to a transverse frame member of a vehicle, said first guide structure having opposed faces forming ways;
   b. a second guide structure having faces forming ways slidably engageable with said ways of said first guide structure for guided up and down movement of said second guide structure relative to said transverse frame member;
   c. an elongate axle assembly having vehicle wheels rotatably mounted on opposite end portions thereof, said axle assembly being below said first and second guide structures, said axle assembly being pivotally connected to said second guide structure whereby said axle assembly is rockable relative to said transverse frame member and movable up and down with said second guide structure;
   d. one of said first and second guide structures being movable within the other of said guide structures;
   e. an elongate spiral spring within the inner of said first and second guide structures, said spring having and upper end engaging one of said first and second guide structures and a lower end engaging the other of said first and second guide structures whereby said spring resiliently supports the frame relative to said axle assembly;
   f. a pair of brackets mounted on opposite sides of said first guide structure, said brackets each being above and aligned with said axle assembly; and
   g. a pair of elongate inflatable pneumatic resilient members each having a lower end mounted on said axle assembly and each having an upper end mounted on one of said brackets whereby said pneumatic resilient members are on opposite sides of the pivotal connection of the axle assembly to the second guide structure and are operative to resiliently resist articulation of the axle assembly.

2. The suspension system as set forth in claim 1 including:

a. an axle mounting plate mounted on a lower end of said second guide structure; and
   b. a pair of abutment members mounted on a lower surface of said axle mounting plate, said abutment members being centered about said pivotable mounting of said axle assembly and positioned to be engaged by said axle assembly in response to pivotal movement thereof beyond that absorbed by said inflatable resilient members.

3. A suspension system for vehicles having a frame with a transverse frame member for carrying a respective wheel carrying axle, said suspension system comprising:

a. an elongate first guide structure mounted on a transverse frame member of a vehicle, said first guide structure being an elongate rectangular member having a central rectangular aperture having opposed interior faces forming ways;
   b. an elongate second guide structure having exterior faces forming ways slidably engageable with said ways of said first guide structure for guided up and down movement of said second guide structure relative to said transverse frame member, said second guide structure having a central aperture therein;
   c. an elongate axle assembly having vehicle wheels rotatably mounted on opposite end portions thereof, said axle assembly being below said first and second guide structures, said axle assembly being pivotally connected to said second guide structure whereby said axle assembly is rockable relative to said transverse frame member and movable up and down with said second guide structure;
   d. an elongate spiral spring within said central aperture in said second guide structure, said spring having an upper end engaging an upper end of said first guide structure and a lower end engaging said second guide structure for resiliently supporting the frame relative said axle assembly;
   e. a pair of elongate inflatable pneumatic resilient members each having a lower end mounted on said axle assembly and each having an upper end operatively connected to said first guide structure on opposite sides thereof;

f. an upper retainer mounted in an upper end of said first guide structure and having a portion thereon engaged by said upper end of said spring;

g. a lower retainer fixedly mounted within said central aperture within said second guide structure and having a portion thereon engaged by said lower end of said spring;

h. an elongate means having an end extending vertically through one retainer and the other end thereof fixedly mounted on the other retainer whereby said one retainer may move up and down relative to said elongate means; and i. rebound limiting means adjustably mounted on said elongate means and positioned for engaging said one retainer thereby limiting up and down rebound of said axle assembly.

4. A suspension system for vehicles having a frame with a transverse frame member for carrying a respective wheel carrying axle, said suspension system comprising:

a. an elongate first guide structure mounted on a transverse frame member of a vehicle, said first guide structure being an elongate member having a central noncircular portion having opposed faces forming ways;

b. an elongate second guide structure having faces forming ways slidably engageable with said ways of said first guide structure for guided up and down movement of said second guide structure relative to said transverse frame member, said second guide structure having an aperture therein;

c. one of said guide structures having a portion with the ways thereof movable within the other guide structure, said one of said guide structures being hollow;

d. an elongate axle assembly having vehicle wheels rotatably mounted on opposite end portions thereof, said axle assembly being below said first and second guide structures, said axle assembly being pivotally connected to said second guide structure whereby said axle assembly is rockable relative to said transverse frame member and movable up and down with said second guide structure;

e. an elongate spring within said one guide structure, said spring having one end engaging said first guide structure and another end engaging said second guide structure for resiliently supporting the frame relative said axle assembly;

f. a pair of brackets mounted on opposite sides relative said first guide guide structure and movable therewith, said brackets each being above and aligned with said axle assembly;

g. a pair of elongate inflatable pneumatic resilient members each having a lower end mounted relative said axle assembly and each having an upper end relative one of said brackets;

h. an upper retainer adjustably mounted in an upper end of said first guide structures, said upper retainer having a shoulder thereon positioned to be engaged by an end of said spring;

i. a lower retainer fixedly mounted within said aperture within said second guide structure, said lower retainer having a shoulder thereon positioned to be engaged by the other end of said spring;

j. an elongate shaft having one end extending vertically through one of said upper and lower retainers and having the other end thereof fixedly mounted relative the other of said upper and lower retainers whereby said one retainer may move up and down relative to said elongate shaft; and k. rebound limiting means adjustably mounted on said one end of said shaft, said rebound limiting means being positioned for engaging the adjacent retainer thereby limiting up and down rebound of said axle assembly.

5. A suspension system for vehicles having a frame with a transverse frame member for carrying a respective wheel carrying axle, said suspension system comprising:

a. an elongate first guide structure mounted on a transverse frame member of a vehicle, said first guide structure being an elongate rectangular member having a central rectangular aperture having opposed interior faces forming ways;

b. an elongate second guide structure having exterior faces forming ways slidably engageable with said ways of said first guide structure for guided up and down movement of said second guide structure relative to said transverse frame member, said second guide structure having a central aperture therein;

c. a plurality of slide plates mounted on said exterior faces of said second guide structure, said slide plates each being in firm engagement with a respective interior face of said aperture within said first guide structure;

d. an elongate axle assembly having vehicle wheels rotatably mounted on opposite end portions thereof, said axle assembly being below said first and second guide structures, said axle assembly being pivotally connected to said second guide structure whereby said axle assembly is rockable relative to said transverse frame member and movable up and down with said second guide structure;

e. an elongate spiral spring within said central aperture in said second guide structure, said spring having an upper end engaging an upper end of said first guide structure and a lower end engaging said second guide structure for limiting said up and down movement of said axle assembly;

f. a pair of brackets mounted on opposite sides of said first guide structure, said brackets each being above and aligned with said axle assembly;

g. a pair of elongate inflatable resilient members each having a lower end mounted on said axle assembly and each having an upper end mounted on one of said brackets;

h. an upper retainer adjustably mounted in an upper end of said first guide structure, said upper retainer having a shoulder thereon positioned to be engaged by said upper end of said spring;

i. a lower retainer fixedly mounted within said central aperture within said second guide structure, said lower retainer having a shoulder thereon positioned to be engaged by said lower end of said spring;

j. an elongate shaft having an upper end extending vertically through said upper retainer and having a lower end thereof fixedly mounted on said lower retainer whereby said upper retainer may move up and down relative to said elongate shaft; and k. rebound limiting means adjustably mounted on said upper end of said shaft, said rebound limiting means being positioned for engaging said upper retainer thereby limiting up and down rebound of said axle assembly.